United States Patent [11] 3,631,992

| [72] | Inventor | Lawrence C. Dickinson<br>Reno, Nev. |
|---|---|---|
| [21] | Appl. No. | 852,856 |
| [22] | Filed | Aug. 25, 1969 |
| [45] | Patented | Jan. 4, 1972 |
| [73] | Assignee | Sperry Rand Corporation<br>New Holland, Pa. |

[54] APPARATUS FOR UNLOADING A BALE WAGON ONE BALE AT A TIME
18 Claims, 12 Drawing Figs.

[52] U.S. Cl. .................................................. 214/8.5 A,
214/6 B, 214/508
[51] Int. Cl. ............................................... B65g 59/06
[50] Field of Search .......................................... 214/8.5 A,
8.5 K, 8.5, 6 B, 8 SR

[56] References Cited
UNITED STATES PATENTS

| 3,097,754 | 7/1963 | Franklin | 214/520 X |
| 3,428,192 | 2/1969 | Witmer | 214/8.5 A |
| 2,815,874 | 12/1957 | Kowal | 214/44 |
| 3,490,613 | 1/1970 | Eggenmuller | 214/8.5 A X |
| 3,502,230 | 3/1970 | Grey | 214/8.5 A X |

Primary Examiner—Gerald M. Forlenza
Assistant Examiner—George F. Abraham
Attorneys—Joseph A. Brown, John C. Thompson, James J. Kennedy and George C. Bower ABSTRACT: This invention pertains to a bale handling wagon which can unload a stack of bales mounted thereon from the wagon one bale at a time.

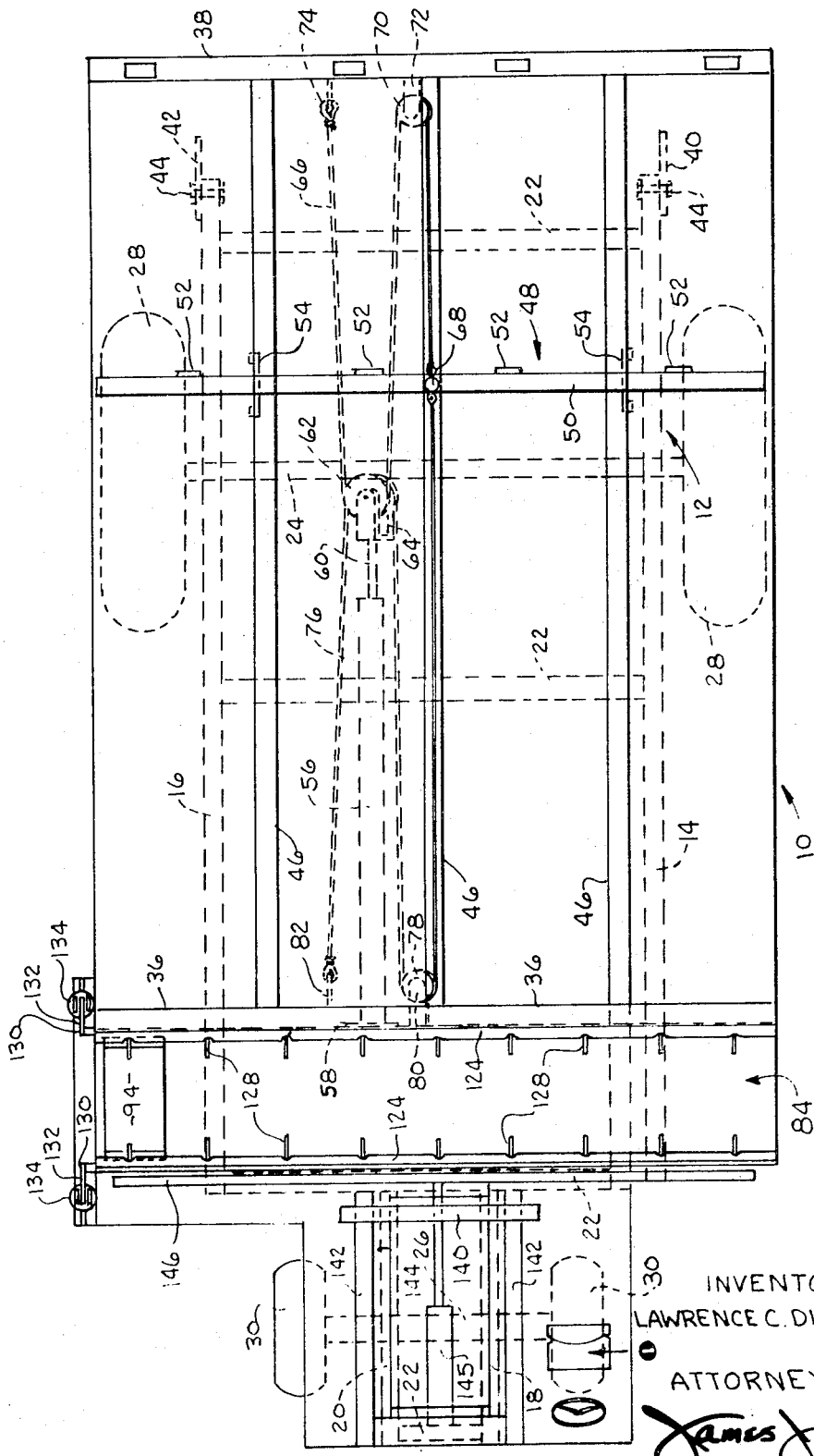

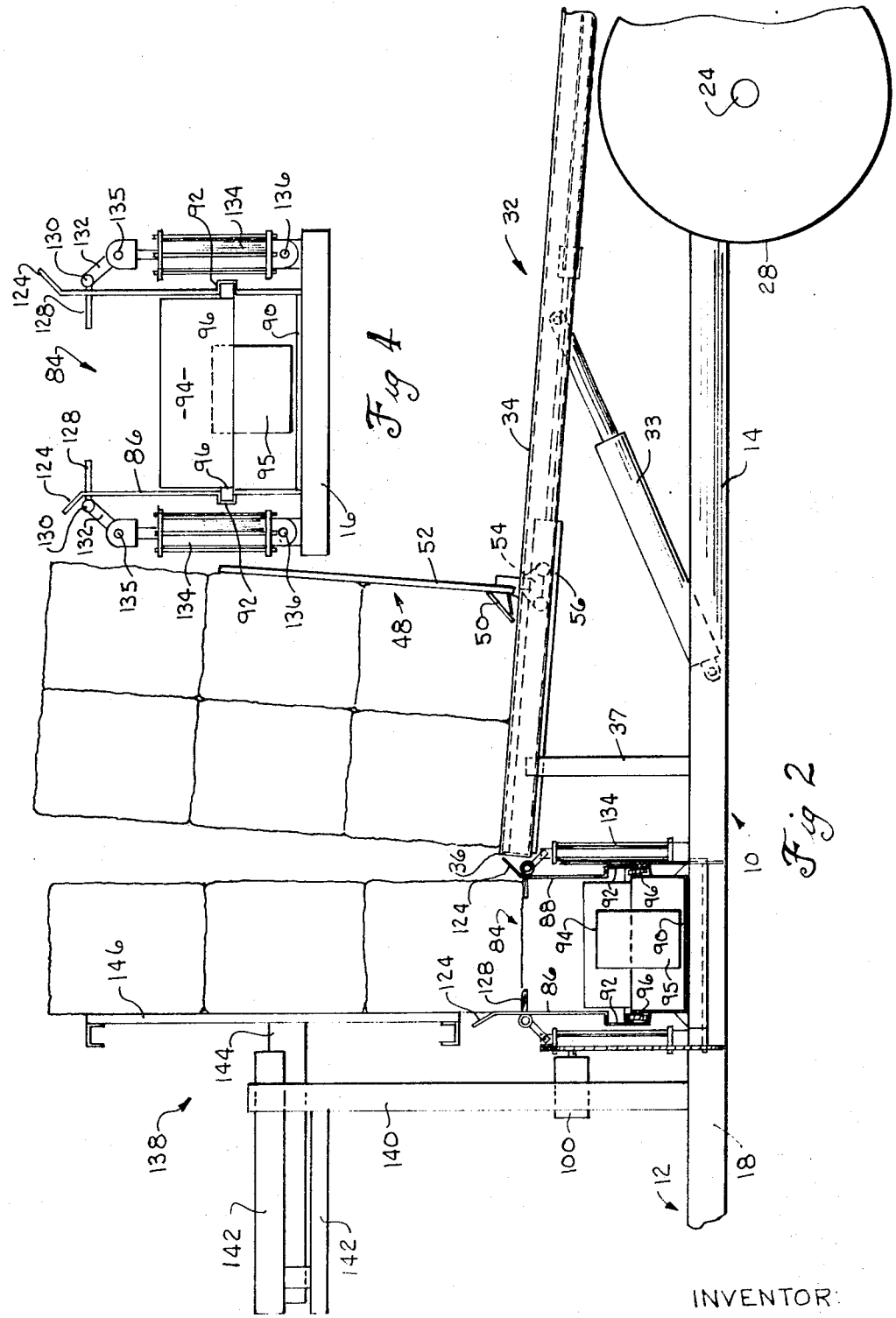

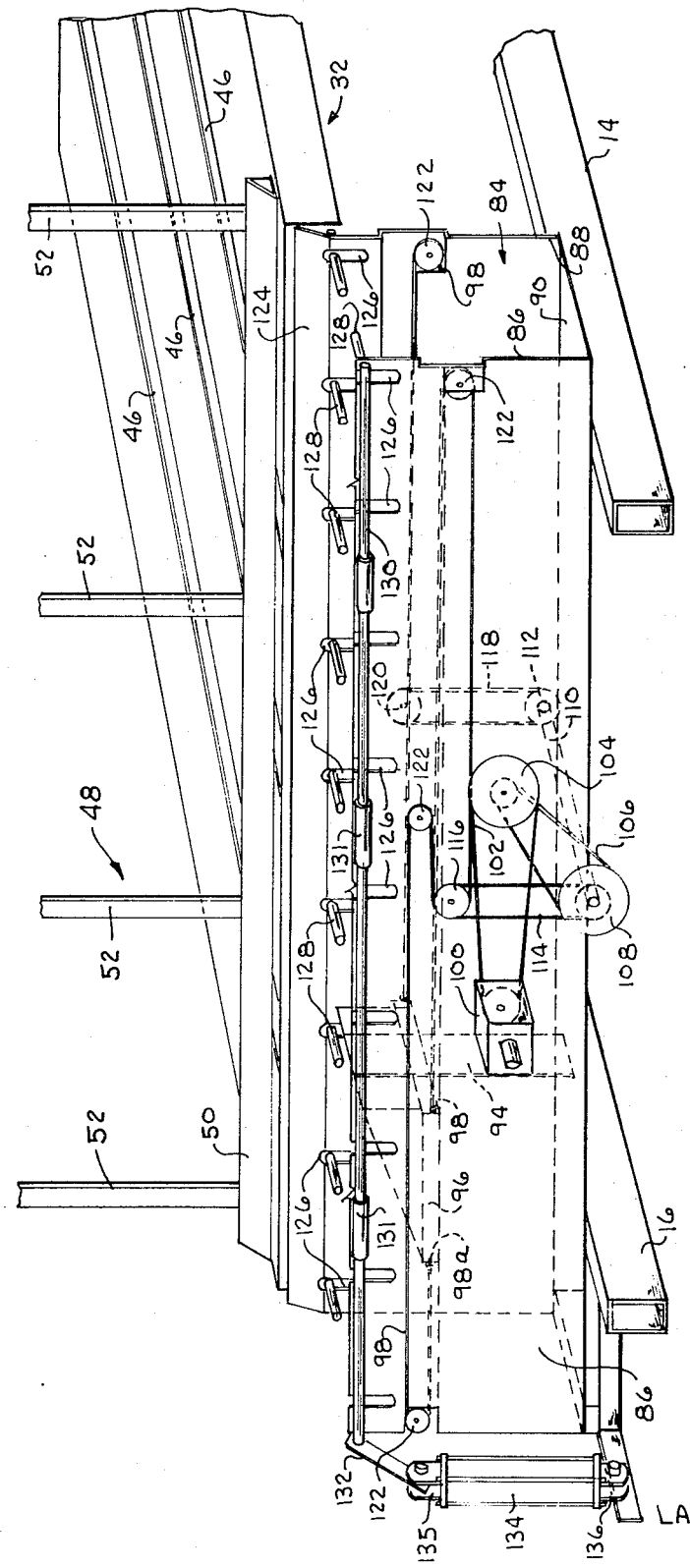

INVENTOR:
LAWRENCE C. DICKINSON

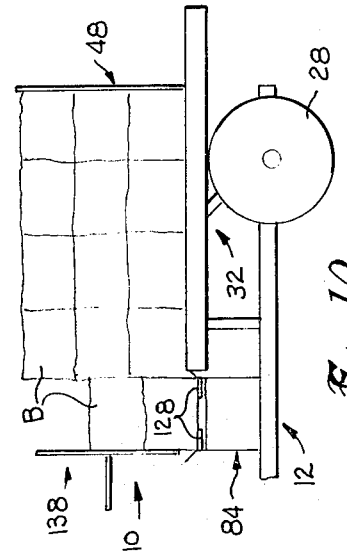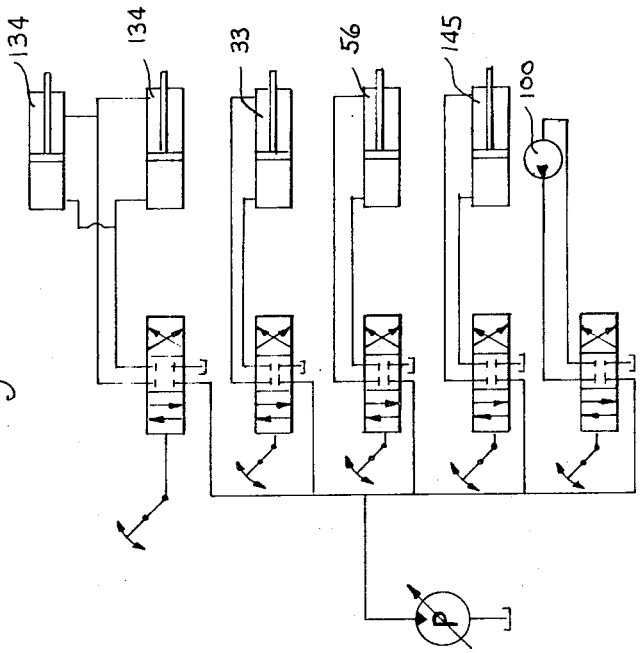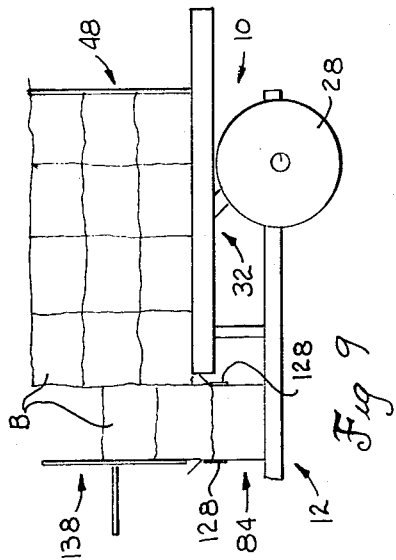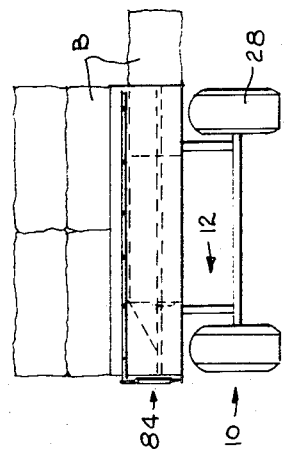
INVENTOR
LAWRENCE C. DICKINSON

APPARATUS FOR UNLOADING A BALE WAGON ONE BALE AT A TIME

BACKGROUND OF THE INVENTION

Automatic bale handling, in which bales can be picked up from the field and formed into a stack for transport and delivery to a storage area was described in U.S. Pat. No. 2,848,127 to Grey. This particular bale wagon illustrated the first commercially successful attempt in automatically picking up bales forming them into a stack on the wagon, delivering them to a storage point and discharging the entire stack from the wagon. Subsequent Grey type machines were able to retrieve an entire stack so that it might be transported to another position. This particular method of operation has been suitable for some farming areas mainly in the Southwest areas where large stacks are stored outdoors. However, many farmers and ranchers are not able to store their bales out of doors and in many instances it would be most convenient if they had some way of driving their wagon along a feed trough where dairy cows or beef cattle are feeding so that the baled material could be deposited directly into the feed troughs. Many attempts have been made to produce such wagons but they have not been entirely successful.

It is desirable to unload the bales one at a time so that a bale wagon could be used to place bales directly into a barn elevator for storage in a hay mow or to permit the farmer to drive along his feed troughs to unload bales at various points therealong. In the first instance, where the farmer desires to store his bales in a hay mow, it has previously been necessary to have a considerable amount of manpower available to unload the wagon and place the bales on the elevator for delivery to the farm for storage. With farm conditions being as they are, it is not always desirable or feasible to have this manpower available. Therefore, some type of automatic means which would require only the wagon or tractor operator to be present would be highly desirable so that the wagon could be unloaded one bale at a time into the bale elevator. In the second instance, when feeding a large dairy or beef cattle herd, the feed troughs will extend for a considerable distance. To have to hand carry the bales from a stack, or other storage area, also requires a great deal of manpower and physical effort. To be able to drive along the feed trough with a single person and unload one bale at a time at various positions along the feed trough would be highly desirable.

SUMMARY OF THE INVENTION

Accordingly, therefore, the principle object of this invention is to provide a bale wagon which will permit unloading of a stack of bales therefrom, one bale at a time, using only the wagon, or tractor, operator.

Another object of this invention is to provide a bale wagon which is capable of picking up an entire stack of bales, transporting them to the discharge location and subsequently discharging the bales from the wagon one bale at a time in an automatic fashion.

Another object of this invention is to provide means on the bale wagon for separating the bales being discharged from the remaining bales on the wagon to facilitate movement thereof without interference of the other bales.

A further object of this invention is to provide a bale unloading means which is disposed at the forward end of the wagon and which unloads bales transversely of the direction of travel of the wagon.

Other objects of this invention will become apparent from the description and claims which follow.

BRIEF DESCRIPTION OF THE DRAWINGS

FIG. 1 is a plan view of the bale wagon showing the load-carrying bed and the discharge trough;

FIG. 2 is a partial side view of the wagon showing the relationship of the load-carrying bed to the unloading trough;

FIG. 3 is a partial isometric view of the single bale unloading wagon constructed in accordance with the present invention;

FIG. 4 is an end view of the unloading trough;

FIGS. 5–11 are schematic views showing the sequence of operation from the loading of a stack of bales onto the wagon to the subsequent discharge thereof one bale at a time; and FIG. 12 is a schematic hydraulic diagram of the hydraulic elements needed to operate the device.

DESCRIPTION OF PREFERRED EMBODIMENT

Figure 6:
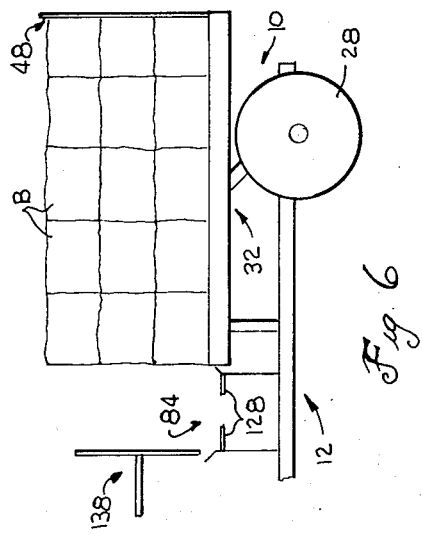

Referring now in detail to the drawings, the self-propelled bale hauling and unloading wagon is designated generally by the numeral 10 and it is comprised of a wheel-supported chassis structure 12, a load-carrying bed 32, a movable rolling rack 48, and unloading apparatus 84 and a forward stabilizing rack 138. It will be understood by those skilled in the art that the same concept may be applied to a "pull-type" wagon where motive power is supplied by the pulling vehicle.

The chassis structure 12 is comprised of a pair of generally parallel, longitudinally extending side rails 14 and 16, forward side rails 18 and 20 which are suitably fixed to a forward cross-rail 22 extending between side rails 14 and 16, respectively, a plurality of other crossrails 22 which extend between the side rails, a rear axle 24 suitably connected to side rails 14 and 16, a forward axle 26 suitably connected to side rails 18 and 20, rear wheels 28 rotatably mounted on axle 24 and forward wheels 30 suitably rotatably mounted on axle 26. An operator's platform 0 is disposed at the forward end of the wagon and from this position, the operator may drive his wagon over the ground and suitably control the operation of the various components of the wagon as will be hereinafter described in detail.

The load-carrying bed 32 is mounted rearwardly on the chassis structure 12 and is suitably pivotally connected thereto by means of brackets 40 and 42 which are welded to the load-carrying bed and depend therefrom and pivot pins 44 which extend through the brackets 40 and 42 and into the side rails 14 and 16. The load-carrying bed is provided with an upper flat support surface 34 for supporting a plurality of bale tiers, and it has a forward end 36 and a rearward end 38. The load bed 32 is pivoted with respect to the chassis 12 by means of a hydraulic cylinder 33 which is connected between the chassis structure and the lower portion of the load bed, as shown in FIG. 2. A forward support 37 extends upwardly from the chassis structure and supports the load-carrying bed when it is in the load-carrying position as shown in FIG. 2.

A series of parallel, fore-and-aft extending grooves 46 are provided in the upper surface 34 of the load bed. The rolling rack 48, comprised of a crossbar 50, having a plurality of spaced upwardly extending tines 52 thereon, is provided with rollers 54 which are connected to the crossbar 50 and are adapted to ride in the outside grooves 46. The rolling rack is adapted to move fore-and-aft along the load-carrying bed generally at right angles thereto and is powered by means of a hydraulic cylinder 56 which is anchored by one end to the underside of the load-carrying bed at 58, as shown in FIG. 1, and has a rod 60 with a pair of pulleys 62 rotatably mounted in a U-shaped bracket 64 which is connected to the outer end of the rod 60. A cable 66 is connected to the rolling rack at 68 in the middle groove 46 shown in FIG. 1, and extends from the rolling rack rearwardly to an idler pulley 70 which is fixed to the load-carrying bed by means of a bracket 72 forwardly to one of the pulleys 62 and then rearwardly to an anchor connection 74 at the rear portion 38 of the load bed. A second cable 76 is connected at 68 to the rolling rack 48 and extends forwardly therefrom to an idler 78 fixed to the forward portion of load-carrying bed 32 by means of a bracket 80 then rearwardly to the second of the two pulleys at the end of cylinder 56 and finally forwardly again to an anchor 82 fixed at the forward portion 36 of the load-carrying bed. By this connection, as the hydraulic cylinder is actuated, the rolling rack is caused to move either forwardly or rearwardly with respect to the bed.

The unloading apparatus 84 is disposed at the forward end of the load-carrying bed and extends transversely of the wagon chassis structure 12. The unloading apparatus is comprised of a trough having a pair of vertical, spaced-apart sidewalls 86 and 88, a bottom wall 90, a pair of parallel grooves 92 in each side vertical sidewall, a cross conveyor 94, having guides 96 which ride in grooves 92, and a drive means. The trough extends the full width of the load-carrying bed and the cross conveyor is adapted to be driven through the entire length of the trough transversely to the direction of travel of the wagon and the chassis structure. The cross conveyor is provided with the longitudinally extending, parallel, spaced-apart guides 96 which are suitably connected to an upper plate portion 94. A downwardly extending plate 95 is suitably fixed to plate 94 centrally thereof and extends between plate 94 and a point adjacent the bottom of trough floor 90. The cross conveyor is adapted to engage one end of a row of bales which is placed in the trough and to convey the row of bales transversely across the trough and out of the wagon. Motive power is transmitted to the cross conveyor 94 by means of a pair of endless conveyor chains 98 which are connected at points 98a and 98b to the ends of the guides 96, as shown in FIG. 3. A hydraulic motor 100 is driven by means of hydraulic fluid which is directed thereto from a suitable pump, not shown, which is driven by the prime mover, not shown, of the bale wagon itself. The motor 100 is drivingly connected by means of an endless chain 102 to a sprocket 104 which in turn drives a smaller sprocket over which a chain 106 is drivingly connected to a sprocket 108, rotating on a shaft 110. The shaft 110 extends longitudinally rearwardly under the trough and is provided with a second sprocket 112 at the inner end thereof. An endless chain 114 which is drivingly connected to shaft 110 by means of another sprocket, is also drivingly connected to a sprocket 116 at the forward portion of the discharge trough. The endless chain 98 is driven from another sprocket suitably connected to sprocket 116. Chain 118 drivingly connects sprocket 112 and sprocket 120 which is disposed at the rearward side of the unloading trough, as shown in FIG. 3, and it provides motive power to the other endless conveyor chain 98. Both conveyor chains 98 are driven in the same manner and they are driven from the middle area thereof passing over idler sprockets 122 which are disposed in the middle and at the outer ends of the trough as shown in FIG. 3.

Each of the vertical sidewalls 86 and 88 is provided outwardly extending upper edge portions 124. Adjacent the point of connection between the upper edge portions 124 and the vertical sidewalls 86 and 88, there are provided a plurality of spaced-apart elongated slots or apertures 126 which extend in a vertical direction as best shown in FIG. 3. A plurality of spaced-apart elongated, opposed bale finger means 128 are adapted to extend through the slots from a pivot bar 130 which is disposed on each side of the trough behind the vertical sidewalls. Each of the bale fingers are suitably connected by their inner ends to the pivot bar 130 which is, in turn, rotatably supported on the vertical sidewalls 86 and 88 by means of pivot support tubes 131. A link member 32 is fixed to one end of each of the pivot bars 130 and extends therefrom to a pivotal connection 135 at the rod end of a hydraulic cylinder 134. Each of the two pivot bars is connected to its own hydraulic cylinder in an identical way. The cylinder 134 is anchored by its other end 136 to the chassis structure by means of a pin or other suitable means. Each of the cylinders 134 is connected to a suitable source of hydraulic power from a pump, not shown, and upon actuation the cylinders will pivot the bale fingers between an outwardly extended position shown in FIG. 3, and a downwardly extending position, shown schematically in FIG. 9, so that the finger means 128 are rotated out of the trough behind the planes of the sidewalls in the elongated slots 126.

Mounted forwardly of the discharge trough and the load-carrying bed, is an overhead bale-stabilizing rack 138 which is comprised of an upright U-shaped frame member 140 which is suitably connected at its lower end to the chassis structure 12, a pair of forwardly extending generally parallel, spaced-apart frame members 142 which are connected to frame member 140, a movable carriage portion 144 and a rack 146. The carriage portion 144 is adapted to move longitudinally in a fore-and-aft direction with respect to the bale wagon, in the frame portion 142 by means of a hydraulic cylinder 145, shown in FIG. 1. At the forward end of the carriage 144 there is provided a vertically extending rack portion 146 comprises of a plurality of spaced-apart tine members formed in a frame. As bales are being unloaded from the wagon the overhead rack serves to keep the individual tiers in a vertical position and keep them from toppling forwardly from the discharge apparatus.

Figure 8:
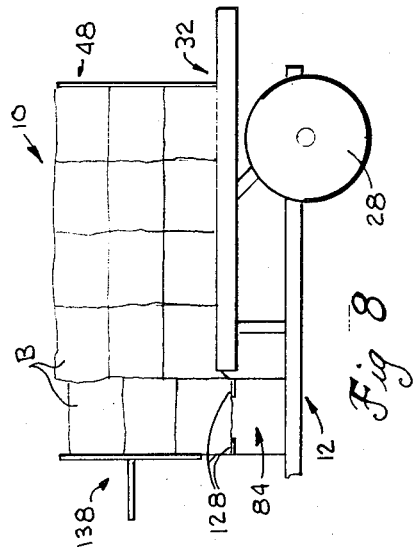
Figure 5:
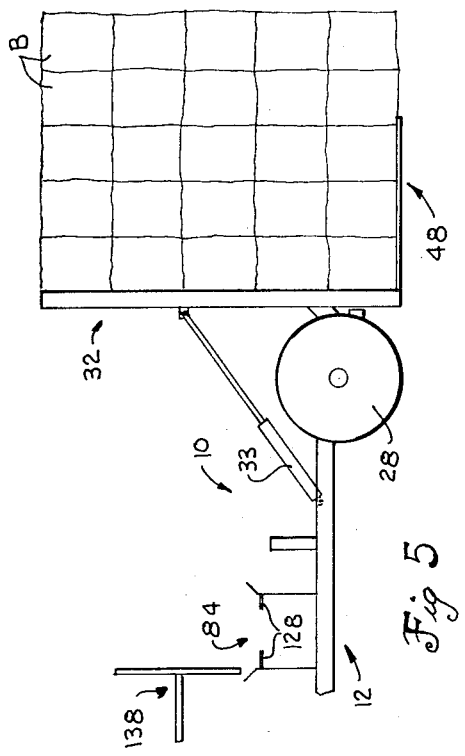
Figure 7:
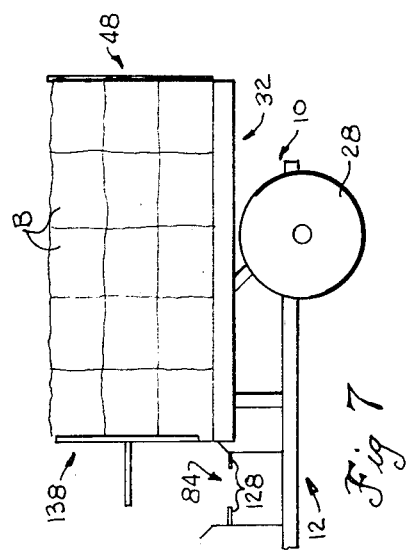

The operation of the machine may be best described by referring to the schematic FIGS. 5-11 which show the various sequences in the operation. First, the rolling rack 48 of the bale wagon 10 is moved to its furthest rearward position on load bed 32 and the bed cylinder 33 is actuated causing the load bed to pivot to an upright position shown in FIG. 5. The wagon is then backed into a stack of bales with the rolling rack being at 90° to the load bed. The bale stack is comprised of a plurality of vertically extending side by side bale tiers, each tier having a plurality of layers. Next, the load bed is then pivoted to the downward or bale support position, shown in FIG. 6, so that a stack of bales is now sitting on the load bed. The stack retrieval operation is conventional. Once the stack of bales has been placed on the load carrying bed and the bed has been rotated to its load support position, the overhead rack 138 is powered forward by its cylinder 145 so that the stack of bales is clamped between the rolling rack and the overhead rack as shown in FIG. 7. The entire stack may then be transported on the wagon to a suitable point of discharge. Upon reaching the discharge position, the bale figure means are rotated to the up position if they have not already been so positioned and the rolling rack 48 and the overhead rack 38 are powered forward so that the first tier of bales is moved from the load carrying bed and supported above the discharge apparatus 84 on the bale fingers 128 as shown in FIG. 8. The bale fingers 128 are then rotated by means of cylinders 134 to the downwardly extending position, shown in FIG. 9, so that the first tier of bales is permitted to drop downwardly into the trough. Once this has been done, the bale fingers are then rotated up or to the outwardly extending position, shown in FIG. 10, so that the upper rows of bales are lifted from the lowest row of bales. This separation of the lowest row of bales from the uppermost rows of bales permits discharge of the lowest row of bales from the wagon in an uninterrupted fashion without interference from the remaining bales on the wagon. The hydraulic motor 10 is then actuated, once the lower row of bales have been separated from the upper bales so that the cross conveyor is driven transversely across the wagon chassis from one side to the other forcing the row of bales ahead of it and discharging the bales from the wagon one bale at a time. This operation is shown schematically in FIG. 11.

FIG. 12 shows the hydraulic circuit for such a single bale unloading wagon and it is adapted only to be illustrative of an operable circuit and not necessarily being representative of the only way in which the apparatus may be powered. Operation of the in valves in this circuit are shown by manual means but it is to be understood that an appropriately electrically controlled valves could also be used. The variable displaced pump is adapted to be directly driven from the prime source of power from the bale wagon, and this pump will supply hydraulic fluid to the entire system.

While this invention has been described in connection with a single embodiment, it will be understood that this embodiment is capable of modification, and that this application is intended to cover any variation, uses, or adaptations following, in general, the principles of the invention and including such departures from the present disclosure as come within the known or customary practice in the art to which the invention pertains.

Having thus described my invention, what I claim is:

1. A wagon for unloading bales one at a time from a stack of bales on said bale wagon, said stack having a plurality of side by side tiers and each tier having a plurality of layers, one above the other, said wagon comprising:
a chassis;
a load-carrying bed pivotally mounted on said chassis and adapted to receive a stack of bales;
means for moving said stack of bales toward one end of said load-carrying bed, said stack moving means comprising a movable rack mounted on said load-carrying bed for fore-and-aft movement relative thereto;
means mounted on said wagon operable to discharge the lowest layer of bales on the end tier; and
means to engage the next lowest layer of bales in said one tier to hold said next lowest layer from interference with the lowest layer as it is being discharged, said last mentioned means being operative to permit said next lowest layer to drop after the lowest layer has been discharged.

2. A wagon for unloading bales one at a time, as recited in claim 1, wherein said chassis is wheel supported for travel over the ground, and said load-carrying bed is flat and extends in a fore-and-aft direction on said chassis.

3. A wagon for unloading bales one at a time, as recited in claim 1, wherein said means operable to discharge the lowest layer of bales from a tier is disposed below said load-carrying bed at said one end of said chassis.

4. A wagon for unloading bales one at a time, as recited in claim 1, wherein said means operable to discharge the lowest layer of bales from a tier is disposed in a trough having a bottom portion located at least a bale height below said load-carrying bed.

5. A wagon for unloading bales one at a time, as recited in claim 4, wherein said means operable to discharge the lowest layer of bales from a tier is movable in said trough transversely of said chassis.

6. A bale wagon for unloading bales one at a time, as recited in claim 1, wherein said means operable to discharge the lowest layer of bales from a tier is movable transversely of said load-carrying bed.

7. A bale wagon for unloading bales one at a time, as recited in claim 1, wherein said means to engage the next lowest layer of bales in said tier comprises a plurality finger means disposed forwardly of said load-carrying bed.

8. A bale wagon for unloading bales one at a time, as recited in claim 7, wherein said finger means are disposed in opposed spaced-apart relation and are pivotally mounted with respect to said load-carrying bed.

9. A bale wagon for unloading bales one at a time, as recited in claim 1, wherein a trough having an upward opening is disposed on said chassis forwardly of said one end of said load-carrying bed and said means to engage the next lowest layer of bales in said tier is disposed above said trough and pivotally mounted with respect thereto.

10. A bale wagon for unloading bales one at a time as recited in claim 9, wherein said engaging means comprises a plurality of spaced-apart opposed finger means mounted adjacent said upward opening and pivotally movable between an outwardly extending position and a downward retracted position.

11. A bale wagon for unloading bales one at a time, as recited in claim 10, wherein said finger means lift and separate the next lowest layer of bales from the lowest layer to hold said next lowest layer from interference with the lowest layer as it is being discharged when disposed in the outwardly extending position and permit said next lowest layer to drop after the lowest layer has been discharged when disposed in said downward retracted position.

12. A wagon for unloading bales one at a time from a stack of bales on said bale wagon, said stack having a plurality of side by side tiers and each tier having a plurality of layers, one above the other, said wagon comprising:
a wheel-supported chassis;
a load-carrying bed pivotally mounted on said chassis and adapted to receive a stack of bales;
means for moving said stack of bales toward one end of said load-carrying bed;
means operable to discharge the lowest layer of bales of the end tier from the wagon; and
means to engage the next lowest layer of bales in said one tier to hold said next lowest layer vertically spaced from the lowest layer of bales to prevent interference with the lowest layer as it is being discharged, said last mentioned means being operative to permit said next lowest layer to drop downwardly after the lowest layer has been discharged.

13. A wagon for unloading bales one at a time, as recited in claim 12, wherein a trough is disposed on said chassis forwardly of said one end of said load-carrying bed, said trough having a bottom portion spaced below said load-carrying bed and a pair of spaced parallel vertically extending sidewalls, said walls terminating at the level of said bale-carrying bed.

14. A wagon for unloading bales one at a time, as recited in claim 13, wherein said means for discharging the lowest layer of bales is disposed in said trough and transversely movable with respect to said load-carrying bed and said means to engage the next lowest layer of bales are disposed adjacent the upper edge of said vertical sidewalls.

15. A wagon for unloading bales one at a time, as recited in claim 14, wherein said engaging means comprises a plurality of finger means pivotally mounted in said trough sidewalls for movement between an outwardly extending position and a downwardly extending retracted position, said finger means vertically separating said next lowest layer of bales from said lowest layer during discharge when said fingers are in the outwardly extending position.

16. A wagon for unloading bales one at a time from a stack comprised of a plurality of side by side tiers, each having a plurality of layers one above the other, said wagon comprising: a chassis; a load-carrying bed pivotally mounted on said chassis and adapted to receive a stack of bales; conveying means fixed to said chassis and disposed adjacent said load bed and operative to convey bales of individual layers in single file relationship from said wagon; means for moving an end tier of the stack from said load bed onto said conveying means such that the lowermost layer of the end tier is engaged with said conveying means, said moving means comprising a rolling rack operative to move in a fore-and-aft direction along said load bed; and means for engaging the layer adjacent the lowermost layer and moving it along with the layers disposed thereabove away from the lowermost layer, whereby individual bales of the lowermost layer may be conveyed by said conveying means without interference from the adjacent layer, said last mentioned means being operative to release said adjacent layer and the layers disposed thereabove once the lowermost layer has been conveyed from underneath, whereby said adjacent layer drops down onto said conveying means to become the lowermost layer, at which time said last-mentioned means is again actuated to engage the layer adjacent the present lowermost layer and move it along with the layers disposed thereabove away from the present lowermost layer to be discharged from the bale wagon without interference from the adjacent layer.

17. A bale wagon as recited in claim 16 wherein said conveying means is disposed transversely and at the front of said load-carrying bed and spaced at least a bale height below the front edge thereof.

18. A wagon for unloading bales one at a time from a stack of bales on said bale wagon, said stack having a plurality of side by side tiers and each tier having a plurality of layers, one above the other, said wagon comprising: a wheel supported chassis; an open top load-carrying bed pivotally mounted on said chassis and adapted to receive a stack of bales; means for moving said stack of bales toward one end of said load-carrying bed, said means for moving said stack of bales comprises a movable rack mounted on said load-carrying bed for fore-and-aft movement relative thereto, means mounted on said wagon operable to discharge the lowest layer of bales of the end tier from the wagon; and means to engage the next lowest layer of bales in said one tier to hold said next lowest layer from interference with the lowest layer of bales to prevent interference with the lowest layer as it is being discharged, said last mentioned means being operative to permit said next lowest layer to drop downwardly after the lowest layer has been discharged.

* * * * *